US010797356B2

(12) United States Patent
Pais et al.

(10) Patent No.: US 10,797,356 B2
(45) Date of Patent: Oct. 6, 2020

(54) MANAGING BATTERY CURRENT BASED ON TEMPERATURE

(71) Applicant: MOTOROLA MOBILITY LLC, Chicago, IL (US)

(72) Inventors: Martin R. Pais, North Barrington, IL (US); Alberto R. Cavallaro, Northbrook, IL (US); Hossein Maleki, Duluth, GA (US)

(73) Assignee: Motorola Mobility LLC, Chicago, IL (US)

( * ) Notice: Subject to any disclaimer, the term of this patent is extended or adjusted under 35 U.S.C. 154(b) by 1334 days.

(21) Appl. No.: 14/813,289

(22) Filed: Jul. 30, 2015

(65) Prior Publication Data

US 2017/0033411 A1 Feb. 2, 2017

(51) Int. Cl.
*H01M 10/42* (2006.01)
*H01M 10/0525* (2010.01)

(52) U.S. Cl.
CPC .... *H01M 10/4235* (2013.01); *H01M 10/0525* (2013.01); *H01M 2200/10* (2013.01); *H01M 2220/30* (2013.01)

(58) Field of Classification Search
None
See application file for complete search history.

(56) References Cited

U.S. PATENT DOCUMENTS

| 4,075,400 | A | * | 2/1978 | Fritts | H01M 10/4235 |
| | | | | | 429/62 |
| 2012/0135281 | A1 | * | 5/2012 | Choi | H01M 2/16 |
| | | | | | 429/62 |

* cited by examiner

*Primary Examiner* — Daniel S Gatewood
(74) *Attorney, Agent, or Firm* — Loppnow & Chapa

(57) ABSTRACT

A battery can include an anode-electrolyte-cathode stack and a phase-change material. The anode-electrolyte-cathode stack can include at least one anode, at least one cathode, and an electrolyte which more directly interacts with each of the at least one anode and the at least one cathode, wherein the at least one anode electrically interacts with the at least one cathode via the electrolyte. The phase-change material can change phase to actuate an interference with an electrochemistry of the anode-electrolyte-cathode stack proximate an area where a localized temperature exceeds a predefined phase change threshold, the interference with the electrochemistry, which decreases current generation within the anode-electrolyte-cathode stack, can be adapted to occur prior to reaching a temperature that can create a failure within the anode-electrolyte-cathode stack.

10 Claims, 4 Drawing Sheets

MANAGING BATTERY CURRENT BASED ON TEMPERATURE

BACKGROUND

1. Field

The present disclosure is directed to a method and apparatus for managing battery current based on temperature. More particularly, the present disclosure is directed to managing battery current based on a temperature of a phase-change material.

2. Introduction

Current Lithium-ion (Li-ion) battery technology has a low temperature threshold for charging of approximately 45° centigrade (C) and an operation threshold of approximately 60° C. (70° C. in an emergency). Hot spots within cells of the battery form as a result of normal aging and abnormal events. Such abnormal events include manufacturing defects, deformation of cell electrodes due to mechanical abuse such as the battery being dropped or bent, cell non-uniform current distribution over the cell electrodes due to insufficient electrolyte content, non-uniform coatings on the cell electrodes, assembly stacked pressure, and/or battery electronics design flaws leading to over-charging, over-discharging, and/or application of improper charge/discharge currents. Moreover, mobile devices are loaded with power hungry Android application PacKages (APKs) backed by high performance processors. These features do, at times, draw high currents which drive up local heat generation and temperatures within the battery.

Excessive heat from overcharging and operation causes batteries to swell. Li-ion battery packs are vacuum packed, but do have some internal space to accommodate the generation of at least some internal gas. Given the Li-ion battery's chemistry, it poses a safety hazard if temperatures within cells of the battery rise above threshold temperature limits.

For present Li-ion cell technology, electrolyte reactions with anode and cathode oxidation for fully charged cells begins near 75° C. The localized temperature associated with hot-spots can rise above 75° C., depending on localized electrical impedance and a status of a load current. Furthermore, Li-ion cells require specific chemical, thermal and electrical properties in order to function properly under usage and achieve a desired life-cycle. These specific properties result in conditions that are highly sensitive to any changes within the cells. Therefore, any changes to prevent/mitigate Li-ion battery thermal issues must be done carefully to effectively achieve higher load current capabilities, while maintaining the desired life-cycle.

Presently, a single temperature sensor exists external to the battery. This temperature sensor requires monitoring and does not provide sufficient temperature information of local heat/temperature within the battery. This lack of precise temperature monitoring creates a necessity to use more conservative "factors of safety" on temperature predictions and assessments. The more conservative factors of safety dictate a single safe operational temperature, which when applied generally to the entire battery, limits the ability to fully harness current generation capabilities of the battery.

Electric circuits are used to control a rate of charge and discharge of a Li-ion battery. As current demands on mobile devices increase, the electric circuits get more complicated and expensive to implement. Electric circuits require power to operate properly. If the power produced by the Li-ion battery becomes too weak, the electric circuits may not operate properly allowing charging and discharging outside of a manufacturer's safe specified rates for the Li-ion battery. Moreover, electric circuits are subject to manufacturing flaws and failures, which could affect proper operation.

SUMMARY OF THE DISCLOSURE

The disclosure is directed to a battery that can include an anode-electrolyte-cathode stack and a phase-change material. The anode-electrolyte-cathode stack can include at least one anode, at least one cathode, and an electrolyte which more directly interacts with each of the at least one anode and the at least one cathode, wherein the at least one anode electrically interacts with the at least one cathode via the electrolyte. The phase-change material can change phase to actuate an interference with an electrochemistry of the anode-electrolyte-cathode stack proximate an area where a localized temperature exceeds a predefined phase change threshold, the interference with the electrochemistry, which decreases current generation within the anode-electrolyte-cathode stack, can be adapted to occur prior to reaching a temperature that can create a failure within the anode-electrolyte-cathode stack.

The battery can further include a void volume to store a portion of the electrolyte during a phase change of the phase-change material.

The disclosure is further directed to a method that can include construction of an anode-electrolyte-cathode stack comprised of at least one anode, at least one cathode, and an electrolyte which more directly interacts with each of the at least one anode and the at least one cathode, wherein the at least one anode electrically interacts with the at least one cathode via the electrolyte. The method can incorporate a phase-change material in at least one of the at least one anode, the at least one cathode, and the electrolyte. The phase-change material can change phase to actuate an interference with an electrochemistry of the anode-electrolyte-cathode stack proximate an area where a localized temperature exceeds a predefined phase change threshold, the interference with the electrochemistry, which decreases current generation within the anode-electrolyte-cathode stack, can be adapted to occur prior to reaching a temperature that can create a failure within the anode-electrolyte-cathode stack.

The disclosure is further directed to a user device that can include a battery and a phase-change material. The battery can include an anode-electrolyte-cathode stack comprising at least one anode, at least one cathode, and an electrolyte which more directly interacts with each of the at least one anode and the at least one cathode, wherein the at least one anode electrically interacts with the at least one cathode via the electrolyte. The phase-change material can be incorporated in at least one of the at least one anode, the at least one cathode, and the electrolyte. The phase-change material can change phase to actuate an interference with an electrochemistry of the anode-electrolyte-cathode stack proximate an area where a localized temperature exceeds a predefined phase change threshold, the interference with the electrochemistry, which decreases current generation within the anode-electrolyte-cathode stack, can be adapted to occur prior to reaching a temperature that can create a failure within the anode-electrolyte-cathode stack.

The phase-change material can be inert, within an operational range of the battery, to a chemistry of the at least one anode, the at least one cathode, the electrolyte, and at least one separator between the at least one anode and the at least one cathode.

The phase-change material can change phase at or before a manufacturer specified maximum operating temperature for the battery.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

There is a need for high current operation of an anode-electrolyte-cathode stack battery while simultaneously being able to dynamically and locally modulate a rate of charge and/or discharge current based on a temperature within the anode-electrolyte-cathode stack battery. In particular, there is a need for such dynamic and local modulation of a rate of charge and/or discharge without shortcomings associated with electric circuits used to control a rate of charge and/or discharge.

Figure 1:
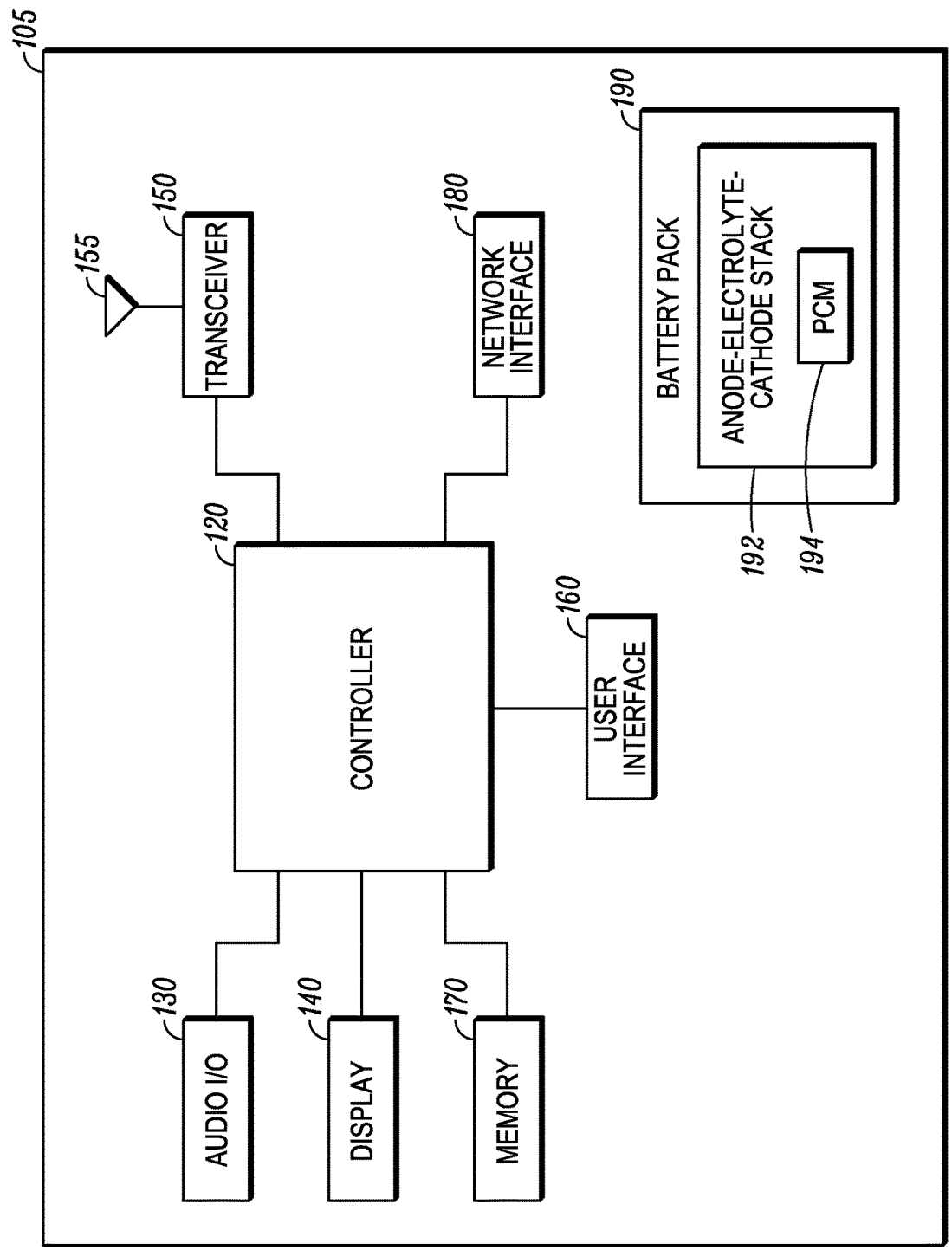
FIG. 1 illustrates a block diagram of an example user device, according to one or more possible embodiments.

FIG. 1 illustrates a block diagram of an example user device 100, according to one or more possible embodiments. The user device 100 can be a portable or stationary device that has energy storage capabilities, for example a wireless terminal, a portable wireless communication device, a smartphone, a cellular telephone, a flip phone, a personal digital assistant, a portable computer, a tablet computer, an uninterruptable power supply (UPS), an electric vehicle, or any other user device 100 that can experience temperatures within a battery pack 190 powering the user device 100 that can inhibit the battery pack 190 from operating properly, and/or even damaging the battery pack 190.

The user device 100 can include a housing 105, a controller 120 within the housing 105, audio input and output circuitry 130 coupled to the controller 120, a display 140 coupled to the controller 120, a transceiver 150 coupled to the controller 120, an antenna 155 coupled to the transceiver 150, a user interface 160 coupled to the controller 120, a memory 170 coupled to the controller 120, and a network interface 180 coupled to the controller 120. The user device 100 can further include a battery pack 190, where the battery pack 190 can include an anode-electrolyte-cathode stack 192 and a phase-change material (PCM) 194. In one or more embodiments, the battery pack 190 can further include a fire retardant.

The display 140 can be a viewfinder, a liquid crystal display (LCD), a light emitting diode (LED) display, a plasma display, a projection display, a touch screen, or any other device that displays information. The transceiver 150 can include a transmitter and/or a receiver. The audio input and output circuitry 130 can include a microphone, a speaker, a transducer, or any other audio input and output circuitry. The user interface 160 can include a keypad, a keyboard, buttons, a touch pad, a joystick, another additional display, or any other device useful for providing an interface between a user and an electronic device. The network interface 180 can be a universal serial bus port, an Ethernet port, an infrared transmitter/receiver, an IEEE 1394 port, a WLAN transceiver, or any other interface that can connect an apparatus to a network or computer and that can transmit and receive data communication signals. The memory 170 can include a random access memory, a read only memory, an optical memory, a flash memory, a removable memory, a hard drive, a cache, or any other memory that can be coupled to the user device 100.

The user device 100 or the controller 120 may implement any operating system, such as Microsoft Windows®, UNIX® or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 170 or elsewhere on the user device 100. The user device 100 or the controller 120 may also use hardware to implement disclosed operations. For example, the controller 120 may be any programmable processor. Disclosed embodiments may also be implemented on a general-purpose or a special purpose computer, a programmed microprocessor or microprocessor and peripheral integrated circuit elements, an application-specific integrated circuit or other integrated circuits, hardware/electronic logic circuits, such as a discrete element circuit, a programmable logic device, such as a programmable logic array, field programmable gate-array, or the like.

The network interface 180 can be a wired communication interface, such as a universal serial bus interface, a serial wired interface, a parallel wired interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces.

The anode-electrolyte-cathode stack 192 can consist of various capacities, various physical sizes (large and/or small), one or more chemistries (for example, lead acid, Ni-MH, Ni-CAD, Li, Li-ion, and/or any other chemistry that can provide power to the user device 100), and/or one or more physical constructions (for example, jelly-roll, flat-stack pack, button cell, cylindrical, rolled, prismatic, folded, and/or any other construction that may provide for packing considerations). The anode-electrolyte-cathode stack 192 can be encased in a polyester-aluminum-nylon pouch (not shown for simplification).

The PCM 194 can be inert and not alter a chemistry of the battery pack 190. The PCM 194 can absorb heat when changing from a solid-to-liquid, a liquid-to-vapor, or solid-to-vapor. On cooling, the PCM 194 can return to a former stage from a later stage. The PCM 194 can be tuned to transition between different phases at temperature ranges of interest. The PCM 194 can be tuned to transition between different phases prior to the anode-electrolyte-cathode stack 192 reaching a temperature that will create a failure within the anode-electrolyte-cathode stack 192.

For example, a manufacturer can specify a maximum temperature at which the battery pack 190 can be discharged. The manufacturer may specify approximately 60° centigrade (C) as a maximum operating temperature for the battery pack 190 to prevent damage to the battery pack 190, dependent on the chemistry and/or the physical construction of the battery pack 190. The PCM 194 can be tuned to change phase and actuate an interference with the electrochemistry of the anode-electrolyte-cathode stack 192 at approximately 60° C. The interference of the electrochemistry of the anode-electrolyte-cathode stack 192 can prevent current generation within the anode-electrolyte-cathode stack 192 at a location of a phase-change of the PCM 194, as well as correspondingly limit further localized temperature changes which could otherwise accompany the continued unimpeded current generation. The interference of the electrochemistry can prevent a failure within the anode-electrolyte-cathode stack 192.

The PCM 194 can be an individual or combination fluorocarbon based material, with properties the same as or similar to 3M's Fluorinert™ FC87 (Boiling Point (BP) 30° C.), FC72 (BP 56° C.), FC84 (BP 80° C.), and/or FC77 (BP 95° C.). For example, FC72's phase-change temperature of 56° C. can provide protection for the battery pack 190 that can begin to change phase at a desired predetermined temperature and locally serve to impede further current generation relative to a phase-change threshold temperature of approximately 56° C. Moreover, the PCM 194 can include properties such as: having a high density change, a phase-change temperature range to maintain functional integrity of the battery pack 190 and prevent damage to the battery pack 190, electrical resistance high enough to prevent an internal short circuit within the anode-electrolyte-cathode stack 192 of the battery pack 190, having a boiling-evaporation temperature range between 45-120° C., specific heat (Cp: J/g·K) near the Cp of the anode-electrolyte-cathode stack 192 (for example, 0.8-1.3 J/g·K), a chemical structure with no or ineffective side reactions with components of the anode-electrolyte-cathode stack 192 (electrolyte 240, anode 230 and cathode 210) vs. charge/discharge potentials, a carbon back-bone including individual and any combinations of hard and soft carbon base materials, CxFy materials tailored for wide ranges of gas absorption (for example, oxygen) via molecules designed with a certain inter-molecular bonding force among carbon back-bone and fluorine, and/or any other properties that eliminate or minimize an impact on incorporating the PCM 194 into the anode-electrolyte-cathode stack 192.

The battery pack 190 can employ a small quantity of PCM 194. The PCM 194 can employ a large change in density, for example which can be an order of magnitude or more, during a phase change of the PCM 194 to actuate an interference of the electrochemistry of the anode-electrolyte-cathode stack 192. Given size and weight constraints imposed on the user device 100, a volume of the battery pack 190 can be extremely valuable. Because the PCM 194 can employ a large change in density, the volume of PCM 194 that can be incorporated with the anode-electrolyte-cathode stack 192 can be extremely small and still have a meaningful impact on current generation at or above a phase change threshold temperature. For example, an amount of phase change material prior to phase change on the order of 0.1% of the volume of the anode-electrolyte-cathode stack 192 can have a meaningful impact.

When the user device 100 draws current from the battery pack 190, heat can be generated in the anode-electrolyte-cathode stack 192. This heat could be uniform throughout the anode-electrolyte-cathode stack 192 or the heat can create one or more hot spots in the anode-electrolyte-cathode stack 192. The hot spots may be due to non-uniformity in the anode-electrolyte-cathode stack 192, due to a hot electrical component in a vicinity of the anode-electrolyte-cathode stack 192, due to thermal heat sinking around the anode-electrolyte-cathode stack 192, or any other reasons that can create hot spots in the anode-electrolyte-cathode stack 192. If a local temperature within the anode-electrolyte-cathode stack 192 rises above a phase-change threshold temperature of the PCM 194, the PCM 194 can locally change phase, for example go to a vapor phase. The local phase change at a location of the PCM 194 can both cool the anode-electrolyte-cathode stack 192 at the site of the phase change as part of the absorption of energy associated with the PCM 194 changing its phase, as well as create a level of isolation within the anode-electrolyte-cathode stack 192, which can impact the subsequent generation of further heat. This isolation can cause a decrease in current generation locally at the site of the phase change, reducing the potential for a failure within the anode-electrolyte-cathode stack 192 that may otherwise occur if the current generation was allowed to proceed unimpeded.

Figure 2A:
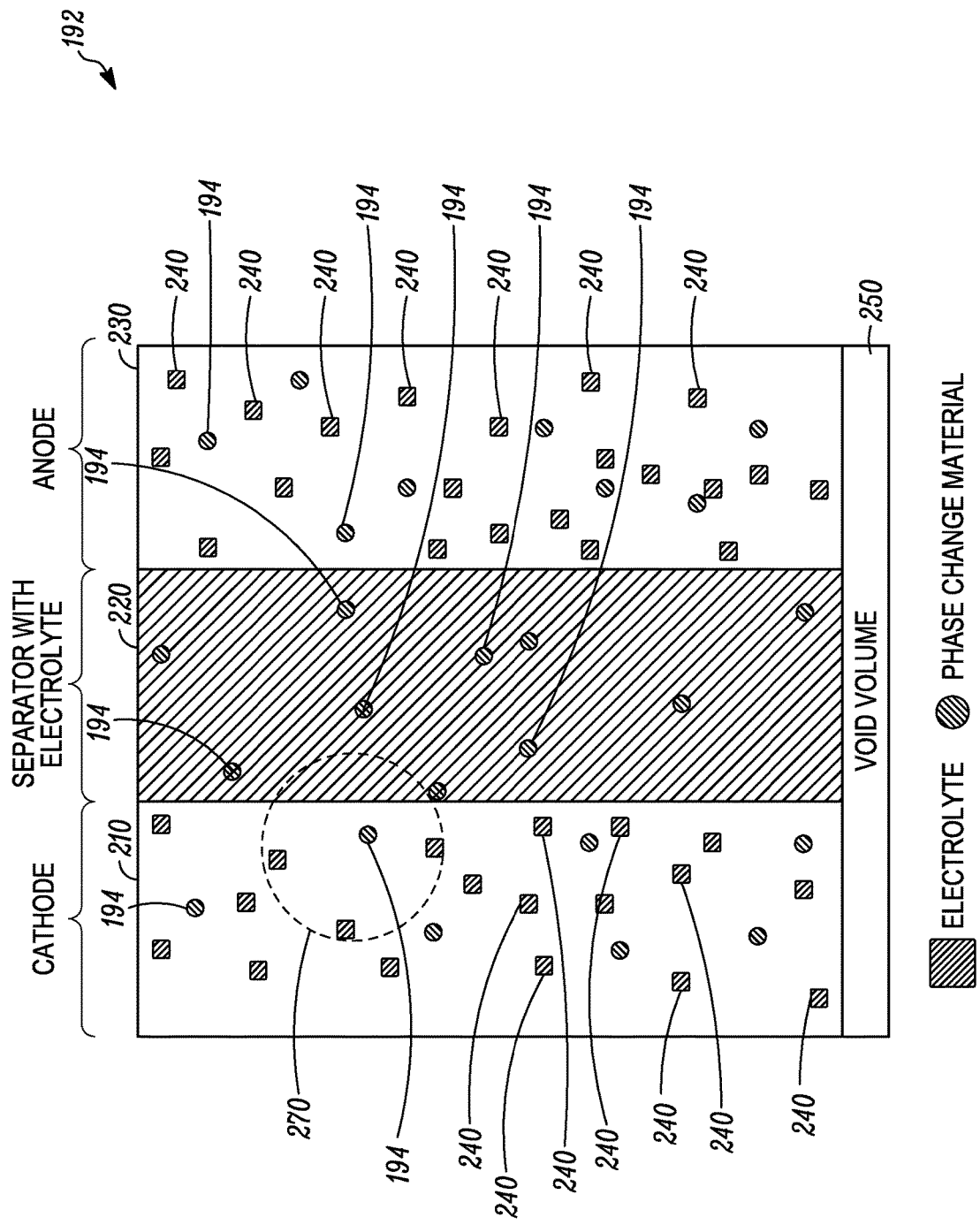
FIG. 2A illustrates an example anode-electrolyte-cathode stack showing a phase-change material prior to undergoing a phase change, according to one or more possible embodiments.

FIG. 2A illustrates an example anode-electrolyte-cathode stack 192 showing the PCM 194 prior to undergoing a phase change, according to one or more possible embodiments. The anode-electrolyte-cathode stack 192 can include a cathode 210, an anode 230, and an electrolyte 240. In the illustrated embodiment, the anode-electrolyte-cathode stack 192 can additionally include a separator 220. Generally, the anode 230 and cathode 210 do not directly interact and exchange ions through an electrolyte 240, that more directly interacts with each of the anode 230 and the cathode 210. In at least some instances, a separator 220 can help insure that the anode 230 and the cathode 210 will not more directly interact through physical contact. In the illustrated embodiment, the anode-electrolyte-cathode stack 192 can additionally include a void volume 250. For example, for a flat stack pack implementation of the anode-electrolyte-cathode stack 192, the void volume 250 can be a side pocket. For a jelly-roll implementation of the anode-electrolyte-cathode stack 192, the void volume 250 can be an end pocket.

Although the anode-electrolyte-cathode stack 192 is illustrated as including a single anode 230 and a single cathode 210 making up a single cell within the battery pack 190, the battery pack 190 can include any number of anode-cathode pairs making up any number of cells within the battery pack 190. The number of cells that may be included in the battery pack 190 is dependent upon the configuration and power requirements of the user device 100, and can vary accordingly.

The cathode 210 can be $Li_xMO_2$) conductive graphite with a polyvinylidene (di)fluoride (PVDF) binder, $LiCoO_2$, $LiMn_{1.5}Ni_{0.5}O_4$, $LiFePO_4$, cobalt, manganese, nickel-cobalt-manganese, phosphate, and/or any other materials that can serve as a cathode. The anode 230 can be an active carbon ($Li_xC_6$) conductive graphite with a PVDF binder, silicon, lithium, lithium-alloying materials, intermetallics, silicon, and/or any other materials that can serve as an anode. The separator 220 can be a porous polyethylene material and the electrolyte 240 can consists of Li-based salt (for example, $LiPF_6$, LiDFOB, LiFOP, or any other salt material). The cathode 210, the anode 230, and/or the separator 220 can be porous materials that can absorb the electrolyte 240 and at least a portion of volume expansion of the PCM 194 that can occur during a phase change of the PCM 194, dependent on a size of the volume expansion. The porosity of the cathode 210, the anode 230, and/or the separator 220 can facilitate transport of the electrolyte 240 and enhance surface area for chemistry and charge transport to occur.

The electrolyte 240 can comprise approximately 7-10% of a volume of the anode-electrolyte-cathode stack 192. The void volume 250 can be a 4-5 mm gap on an end of the anode-electrolyte-cathode stack 192 that allows for sealing of the battery during manufacturing. In one or more embodiments, a copper anode current collector can be bonded to the anode 230 and an aluminum cathode current collector can be bonded to the cathode 210.

The PCM 194 can be impregnated within the cathode 210, the separator 220, the anode 230, and/or mixed into the electrolyte 240. For example, the PCM 194 can be impregnated within pores of the cathode 210, the separator 220, and/or the anode 230, and/or mixed into the electrolyte 240 at a time of manufacture of the battery pack 190. The PCM 194 can be inert, within an operational range of the battery pack 190, to a chemistry of the cathode 210, the separator 220, the anode 230, and/or the electrolyte 240.

The anode-electrolyte-cathode stack 192 can form a local hot spot 270. The hot spot 270 can trigger any PCM 194 at or near a site of the hot spot 270 to change phase. In the example shown, the hot spot 270 can include a single volume of PCM 194A. However, the hot spot 270 can trigger any number of volumes of PCM 194 that are at or near the hot spot 270.

Figure 2B:
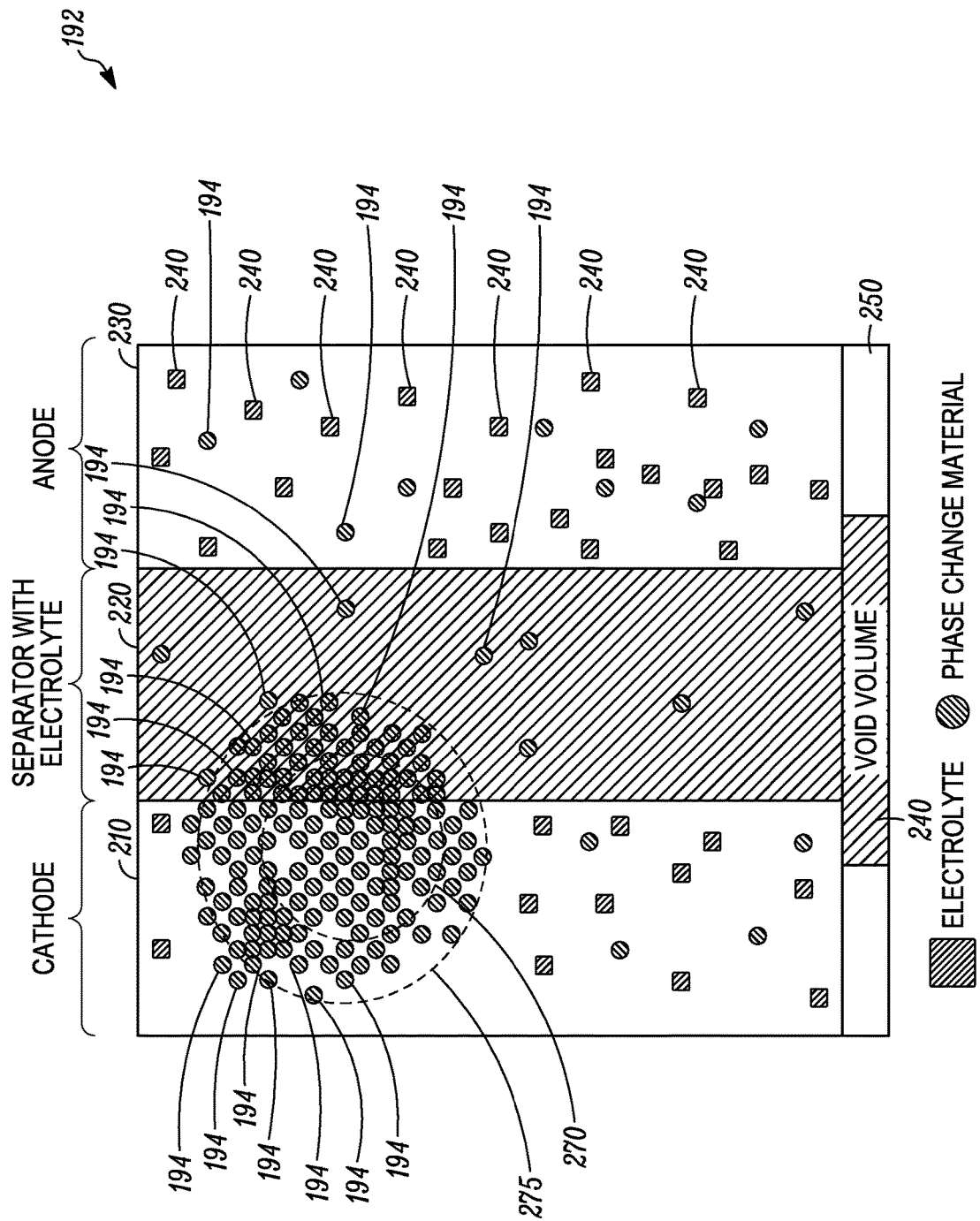
FIG. 2B illustrates an example anode-electrolyte-cathode stack showing the phase-change material after undergoing a phase change, according to one or more possible embodiments.

FIG. 2B illustrates an example anode-electrolyte-cathode stack 192 showing the PCM 194 after undergoing a phase change, according to one or more possible embodiments.

As shown, the PCM 194 within the hot spot 270 can change phase. The PCM 194 can change phase, from at least one of a solid-to-liquid, a liquid-to-vapor, and a solid-to-vapor. This phase change of the PCM 194 can increase a volume of the PCM 194 at or proximate a hot spot to create an area of impact referred to as a PCM hot spot volume 275. The increased volume of the PCM 194 can actuate an interference of an electrochemistry of the anode-electrolyte-cathode stack 192 locally within the PCM hot spot volume 275. The interference of the electrochemistry can locally prevent current generation within the PCM hot spot volume 275 that could otherwise result in higher temperatures proximate the higher currents and could create a failure within the anode-electrolyte-cathode stack 192. The phase change of the PCM 194 within the PCM hot spot volume 275 can locally lower a temperature within the PCM hot spot volume 275 due to a lack of current generation within the PCM hot spot volume 275 and due to the heat absorption associated with a phase change that occurs during a phase change of the PCM 194 from a solid to a liquid, or from a solid/liquid to a gas.

The electrolyte 240 within the PCM hot spot volume 275 can be locally displaced by the phase change of the PCM 194. To compensate for such a displacement, a small portion of electrolyte 240 can be pushed into the void volume 250. Once the PCM 194 cools and reverts phase, the small portion of electrolyte 240 that was pushed into the void volume 250 can return to an original location within the anode-electrolyte-cathode stack 192. The return of the electrolyte 240 to an original location can allow the anode-electrolyte-cathode stack 192 to locally return to producing increased currents within PCM hot spot volume 275.

Figure 3:
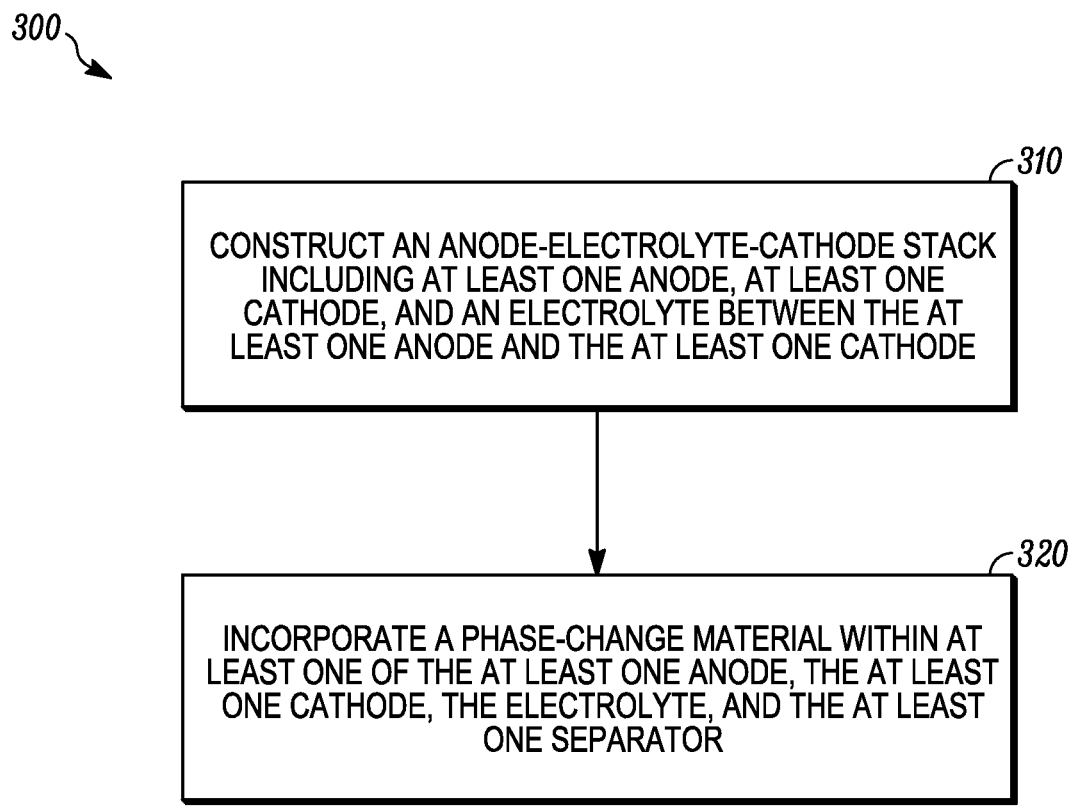
FIG. 3 illustrates a flowchart of an example method of implementing the phase-change material in the anode-electrolyte-cathode stack, according to one or more possible embodiments.

FIG. 3 illustrates a flowchart of an example method 300 of implementing the PCM 194 in the anode-electrolyte-cathode stack 192, according to one or more possible embodiments.

At block 310, the method 300 can begin with construction of a battery pack 190. The battery pack 190 can be constructed of the anode-electrolyte-cathode stack 192. The anode-electrolyte-cathode stack 192 can be constructed to include the anode 230, the cathode 210, and the electrolyte 240. In one or more embodiments, the anode-electrolyte-cathode stack 192 can further include the separator 220.

At block 320, the method 300 can further incorporate the PCM 194 into the battery pack 194. The anode-electrolyte-cathode stack 192 of the battery pack 194 can further include the PCM 194. The PCM 194 can be incorporated in the anode 230, the cathode 210, the separator 220, and/or the electrolyte 240.

During the method 300, the phase-change material 194 can change from at least one of a solid-to-liquid, a liquid-to-vapor, and a solid-to-vapor to actuate an interference of an electrochemistry of the anode-electrolyte-cathode stack 192, the interference of the electrochemistry preventing current generation within the anode-electrolyte-cathode stack 192 that may create a failure within the anode-electrolyte-cathode stack 192. In one or more embodiments, the method 300 can further push a portion of the electrolyte 240 into the void volume 250.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method, comprising:
constructing an anode-electrolyte-cathode stack comprised of at least one anode, at least one cathode, and an electrolyte which more directly interacts with each of the at least one anode and the at least one cathode, wherein the at least one anode electrically interacts with the at least one cathode via the electrolyte; and
incorporating a phase-change material in at least one of the at least one anode, the at least one cathode, and the electrolyte, where the phase-change material is inert with respect to the electrical interaction between the at least one anode and the at least one cathode via the electrolyte;
wherein the phase-change material changes phase to actuate an increased interference with an electrochemistry of the anode-electrolyte-cathode stack, via a change in density and correspondingly an increase in volume of the phase change material as part of a phase change transition, proximate an area where a localized temperature exceeds a predefined phase change threshold, the increased interference with the electrochemistry by the phase change material, which decreases current generation within the anode-electrolyte-cathode stack, being adapted to occur prior to reaching a temperature that can create a failure within the anode-electrolyte-cathode stack; and
wherein the phase change material reverts phase to actuate a non-increased interference with the electrochemistry of the anode-electrolyte-cathode stack, proximate the area where the localized temperature no longer exceeds the predefined phase change threshold.

2. The method according to claim 1, further comprising storing, within a void volume, a portion of the electrolyte during a phase change of the phase-change material.

3. The method according to claim 1, further comprising separating, with at least one separator, the at least one anode and the at least one cathode.

4. The method according to claim 3, further comprising incorporating the phase-change material with the at least one anode, the at least one cathode, the electrolyte, and the at least one separator.

5. The method according to claim 3, wherein the phase-change material is inert, within an operational range of the anode-electrolyte-cathode stack, to a chemistry of the at least one anode, the at least one cathode, the electrolyte, and/or the at least one separator.

6. The method according to claim 1, wherein the phase-change material changes from at least one of a solid to liquid, a liquid to vapor, and a solid to vapor.

7. The method according to claim 1, further comprising incorporating the anode-electrolyte-cathode stack in an electronic device.

8. The method according to claim 1, wherein the phase-change material comprises properties including one or more of being electrical resistant to prevent an internal short circuit with the anode-electrolyte-cathode stack, having a phase-change temperature that prevents damage to the anode-electrolyte-cathode stack, and/or having a wide range of gas absorption.

9. The method according to claim 1, further comprising changing phase of the phase-change material at or before a manufacturer specified maximum operating temperature for the anode-electrolyte-cathode stack.

10. A user device, comprising:
a battery comprising an anode-electrolyte-cathode stack comprising at least one anode, at least one cathode, and an electrolyte which more directly interacts with each of the at least one anode and the at least one cathode, wherein the at least one anode electrically interacts with the at least one cathode via the electrolyte; and
a phase-change material at least one of incorporated in at least one of the at least one anode, the at least one cathode, and the electrolyte, where the phase-change material is inert with respect to the electrical interaction between the at least one anode and the at least one cathode via the electrolyte;
wherein the phase-change material changes phase to actuate an increased interference with an electrochemistry of the anode-electrolyte-cathode stack, via a change in density and correspondingly an increase in volume of the phase change material as part of a phase change transition, proximate an area where a localized temperature exceeds a predefined phase change threshold, the increased interference with the electrochemistry by the phase change material, which decreases current generation within the anode-electrolyte-cathode stack, being adapted to occur prior to reaching a temperature that can create a failure within the anode-electrolyte-cathode stack; and
wherein the phase change material reverts phase to actuate a non-increased interference with the electrochemistry of the anode-electrolyte-cathode stack, proximate the area where the localized temperature no longer exceeds the predefined phase change threshold.

* * * * *